(12) United States Patent
Candelore

(10) Patent No.: US 7,965,839 B2
(45) Date of Patent: Jun. 21, 2011

(54) ENCRYPTION SYSTEM FOR SATELLITE DELIVERED TELEVISION

(75) Inventor: Brant L. Candelore, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 705 days.

(21) Appl. No.: 12/070,464

(22) Filed: Feb. 19, 2008

(65) Prior Publication Data

US 2009/0208006 A1 Aug. 20, 2009

(51) Int. Cl.
*H04N 7/167* (2006.01)
(52) U.S. Cl. ......... 380/200; 380/201; 380/202; 380/203
(58) Field of Classification Search .......... 380/200–204, 380/210, 212; 713/189; 705/51, 57–59; 725/25, 30–31, 26, 27; 726/26–31
See application file for complete search history.

(56) References Cited

U.S. PATENT DOCUMENTS

| | | | |
|---|---|---|---|
| 5,933,500 A * | 8/1999 | Blatter et al. ................ | 380/200 |
| 6,424,714 B1 * | 7/2002 | Wasilewski et al. .......... | 380/200 |
| 7,120,250 B2 | 10/2006 | Candelore | |
| 7,124,303 B2 | 10/2006 | Candelore et al. | |
| 7,127,619 B2 | 10/2006 | Unger et al. | |
| 7,139,398 B2 | 11/2006 | Candelore et al. | |
| 7,151,831 B2 | 12/2006 | Candelore et al. | |
| 7,224,798 B2 | 5/2007 | Pinder | |
| 2003/0023427 A1 | 1/2003 | Cassin et al. | |
| 2003/0026423 A1 | 2/2003 | Unger et al. | |
| 2003/0126086 A1 | 7/2003 | Safadi | |
| 2005/0169473 A1 | 8/2005 | Candelore | |
| 2005/0192904 A1 | 9/2005 | Candelore | |
| 2007/0265978 A1 | 11/2007 | Kahn et al. | |
| 2007/0294170 A1 | 12/2007 | Vantalon et al. | |

OTHER PUBLICATIONS

International Search Report and Written Opinion, PCT/US09/34066, Oct. 22, 2009.
Ahmet M. Eskicioglu, "Digital Rights Management of Multimedia Content Via Encryption and Watermarking," 2004.

* cited by examiner

*Primary Examiner* — Hosuk Song
(74) *Attorney, Agent, or Firm* — Miller Patent Services; Jerry A. Miller

(57) ABSTRACT

A television content delivery system consistent with certain embodiments has a receiver system that receives television content from a plurality of content suppliers. A selective multiple encrypter selectively multiple encrypts the television content, wherein the resultant selectively multiple encrypted content stream is encrypted under at least one conditional access system (CAS) and at least one digital rights management system (DRMS). A transmitter transmits the selectively multiple encrypted television content stream to multiple receivers, so that the selectively multiple encrypted television content stream can be decrypted under either a system using at least one CAS or at least one DRMS. This abstract is not to be considered limiting, since other embodiments may deviate from the features described in this abstract.

29 Claims, 5 Drawing Sheets

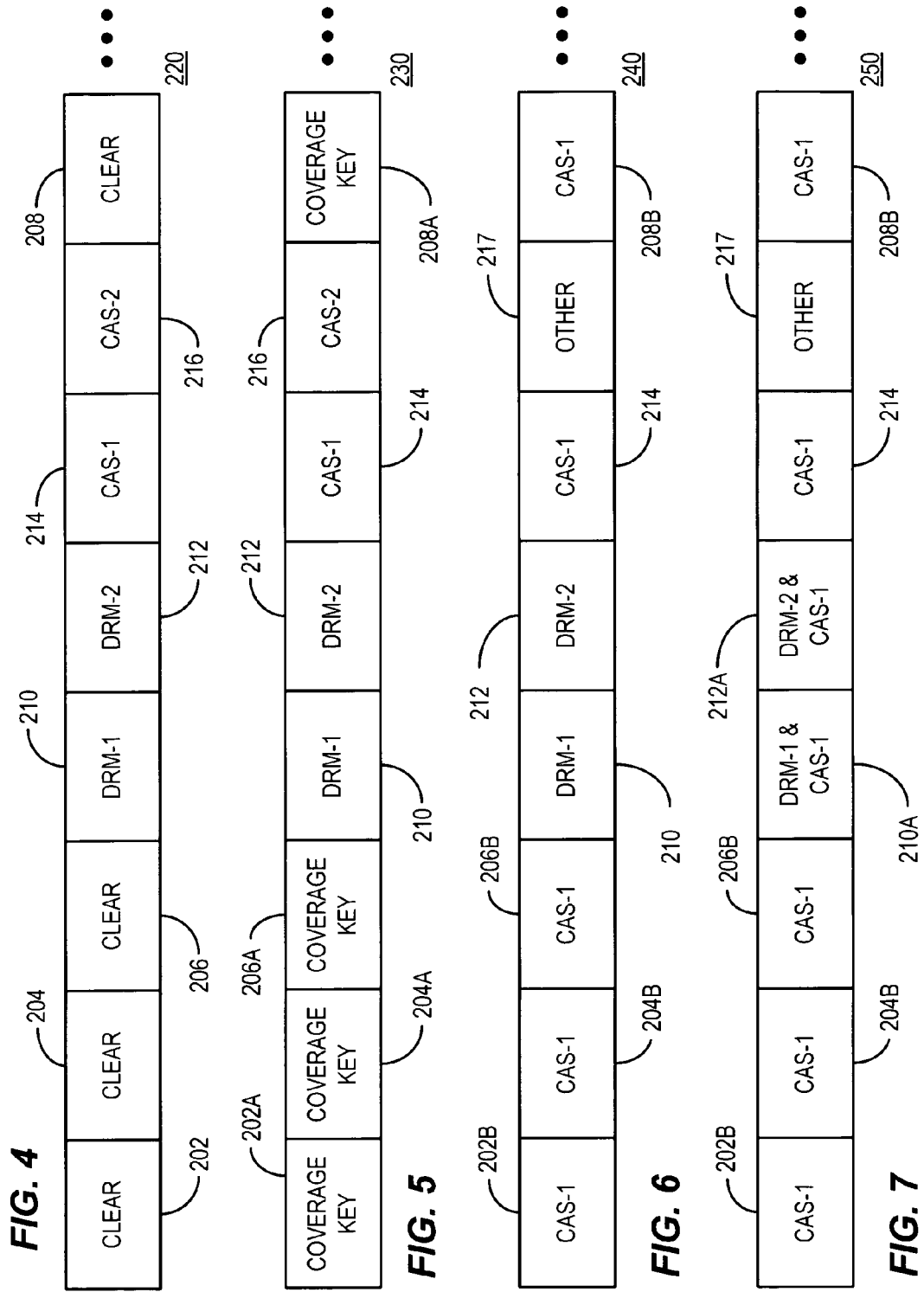

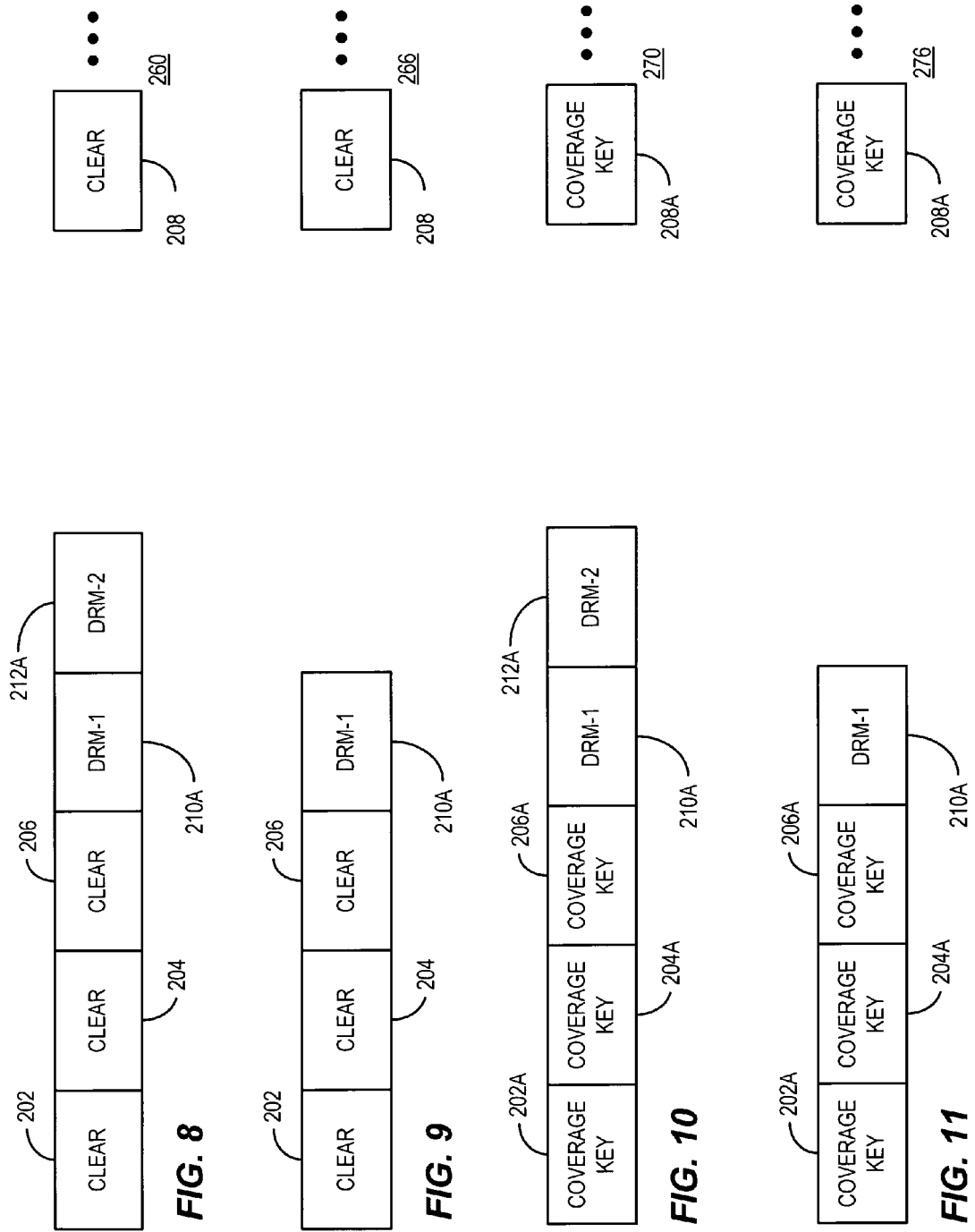

ENCRYPTION SYSTEM FOR SATELLITE DELIVERED TELEVISION

CROSS REFERENCE TO RELATED DOCUMENTS

This application is related to U.S. Patent documents number 2003-0026423-A1; U.S. Pat. Nos. 7,139,398; 7,124,303; 7,151,831; 7,127,619 each filed Jan. 2, 2002; U.S. Pat. No. 7,120,250 filed Dec. 13, 2002; and 2005-0192904-A1 filed Apr. 1, 2005. These applications are representative of multiple selective encryption technology as is used in accord with certain embodiments consistent with the present inventions. These documents are hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

The above-reference patents relate to a technique referred to as partial multiple encryption or selective multiple encryption (interchangeably). This technique can be used to combine normally incompatible encryption techniques into a single television cable system or the like in order to render normally incompatible receivers operable on a common network. These documents relate to Sony Electronics' Passage™ selective multiple encryption technology.

Currently, the main way to get Digital Rights Management (DRM) encrypted content is through Internet connected Personal Computers (PCs). Another way is to translate some of the basic rights from CA-to-DRM (Conditional Access to Digital Rights Management) as is done with the OpenCable Uni-directonal Receiver (OCUR) board used to get Cable content to PCs encrypted using MS WMDRM (Microsoft Windows Media DRM). The OCUR board acts as a host for CableCARD™ (a trademark for a CableLabs compliant Point of Deployment module). After tuning and demodulation by the OCUR board, the scrambled content is sent to an inserted CableCARD. The CableCARD CA descrambles the content. Before returning to the OCUR board, the content is re-protected using DFAST (Dynamic Feedback Arrangement Scrambling Technique) copy protection. The OCUR board descrambles the copy protected content, and then re-scrambles it with DRM. As of this writing, MS WMDRM is the only approved and active DRM system in use with the OCUR board. The DRM encrypted content is formatted into IP packets and sent to the PC motherboard over the USB interface. The DFAST copy protection interface only handles Copy Control Information (CCI) containing 2 bits of data and defining only: Copy Once, Copy Never, and Copy Free. It is therefore difficult for a service provider to define business rules such as a rental period for downloaded content, e.g. content viewable for 1 or 2 days.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 4 is an exemplary selectively encrypted content stream consistent with certain embodiments of the present invention.

FIG. 5 is another exemplary selectively encrypted content stream consistent with certain embodiments of the present invention.

FIG. 6 is another exemplary selectively encrypted content stream consistent with certain embodiments of the present invention.

FIG. 7 is another exemplary selectively encrypted content stream consistent with certain embodiments of the present invention.

FIG. 8 is an exemplary selectively encrypted content stream as provided, for example, to a portable device compatible with either DRM-1 or DRM-2 consistent with certain embodiments of the present invention.

FIG. 9 is an exemplary selectively encrypted content stream as provided, for example, to a portable device compatible with a DRM-1 consistent with certain embodiments of the present invention.

FIG. 10 is an exemplary selectively encrypted content stream as provided, for example, to a portable device compatible with either DRM-1 or DRM-2 as well as a coverage key consistent with certain embodiments of the present invention.

FIG. 11 is an exemplary selectively encrypted content stream as provided, for example, to a portable device compatible with only DRM-1 and a coverage key consistent with certain embodiments of the present invention.

DETAILED DESCRIPTION

Figure 1:
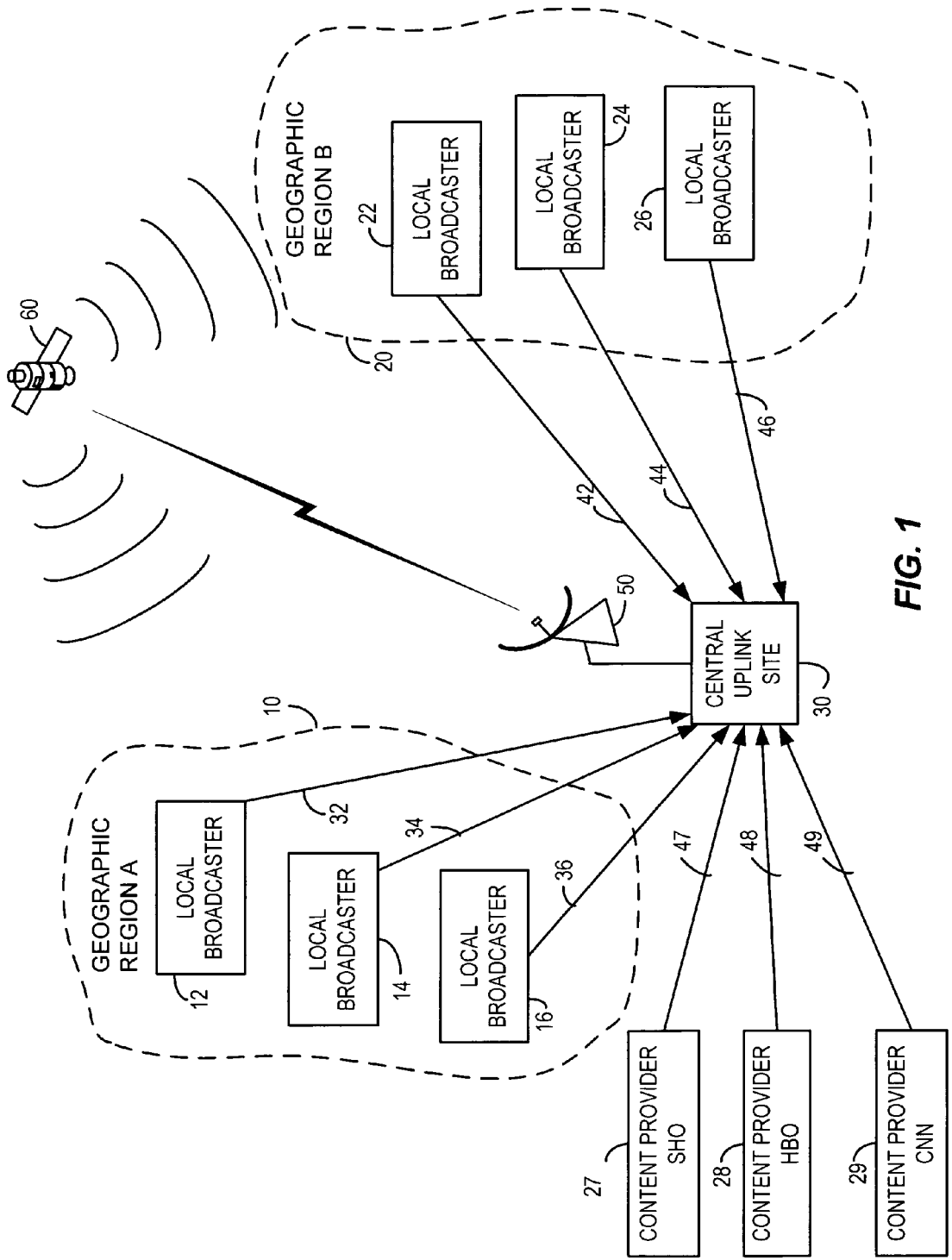
FIG. 1 illustrates an exemplary local-to-local satellite television system over which the present selective encryption arrangement is overlaid in a manner consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The term "critical packet" as used herein is intended to convey the meaning it has acquired in the art of multiple selective encryption (MSE), wherein selected packets are selected for encryption and deemed "critical packets". These packets are not critical in the absolute sense, since in some embodiments they may be derived from other packets given enough computing resources. Rather, if one is unable to decrypt them, they are critical to the proper decoding or decompression or playback of perfect video and audio. Generally speaking, however, it is clearly desirable from a security sense for them to be very important to proper playback, but in a multiple selective encryption system, the security is balanced somewhat by conservation of bandwidth, with greater security often coming at the expense of bandwidth. The packets that are not selected to be critical packets can be referred to as "non-critical packets".

Multiple Selective Encryption (MSE) may be used to send DRM encrypted packets from a satellite uplink all the way to a consumer's receiver, TV, PC or portable device where it may be consumed. The satellite delivered DRM content can be delivered without the need to decrypt and re-encrypt the content which may be susceptible to hacking or loss of control over the content by the service operator. The DRM content can be delivered at the same time as providing aggregation services to commercial receivers. In accord with certain embodiments consistent with the invention, satellite television service providers are enabled to deliver DRM encrypted digital television consumable content from the satellite uplink. This, in certain embodiments, can provide the advantage of delivering television content more directly, in high quality, and with more control. CA and DRM encrypted content can be delivered for consumption by the consumer satellite receiver but also for conveyance to commercial and other consumer devices. The non-critical packets may be sent in the clear or encrypted using a coverage key (as generally described in US-2005-0192904) or a CA key. The DRM-encrypted critical packets may also be dual-encrypted with a CA key that is used to enhance security and facilitate control of the service provider over the content. This approach can enable a large number of eCommerce scenarios.

Turning now to FIG. 1, an exemplary illustration of a local-to-local communication arrangement is depicted. This arrangement is used to provide local television channels to satellite television subscribers, but can also advantageously be used to provide an uplink for content that is retransmitted to other geographic areas or broader geographic areas. As depicted, two geographic regions A and B are depicted as 10 and 20. Each geographic region may include a plurality of local broadcasters that serve their respective areas such as 12, 14 and 16 for region 10, and 22, 24 and 26 for region 20. Broadcasters 12, 14 and 16 respectively convey their content to a central uplink site 30 via communication links 32, 34 and 36 respectively, which may be any suitable communication link (satellite, broadband leased line, Internet, private network, etc.). Similarly, broadcasters 22, 24 and 26 respectively convey their content to a central uplink site 30 via communication links 42, 44 and 46 respectively. The central uplink site then selectively multiple encrypts and multiplexes the content from the plurality of local broadcasters using satellite transmitter and dish 50 to a geosynchronous satellite 60 for retransmission to their respective geographic regions.

In the local-to-local communication scenario, the content from region A (10) is retransmitted to region A and the content from region B (20) is retransmitted to region B. However, in accordance with embodiments consistent with the present invention, the geographic target for downlink need not necessarily correspond in a one-to-one relationship to the geographic area which serves as the source of the content.

In the content provider scenario, by way of example, Showtime (SHO) 27, Home Box Office (HBO) 28 and Cable News Network (CNN) 29 transmit via communication links 47, 48 and 49 to the Central Uplink Site 30. The content can be received by both region A (10) and region B (20). In the accompanying illustrations, the zig-zag line designates uplink communication while the expanding curved lines designate downlink broadcasts.

Figure 2:
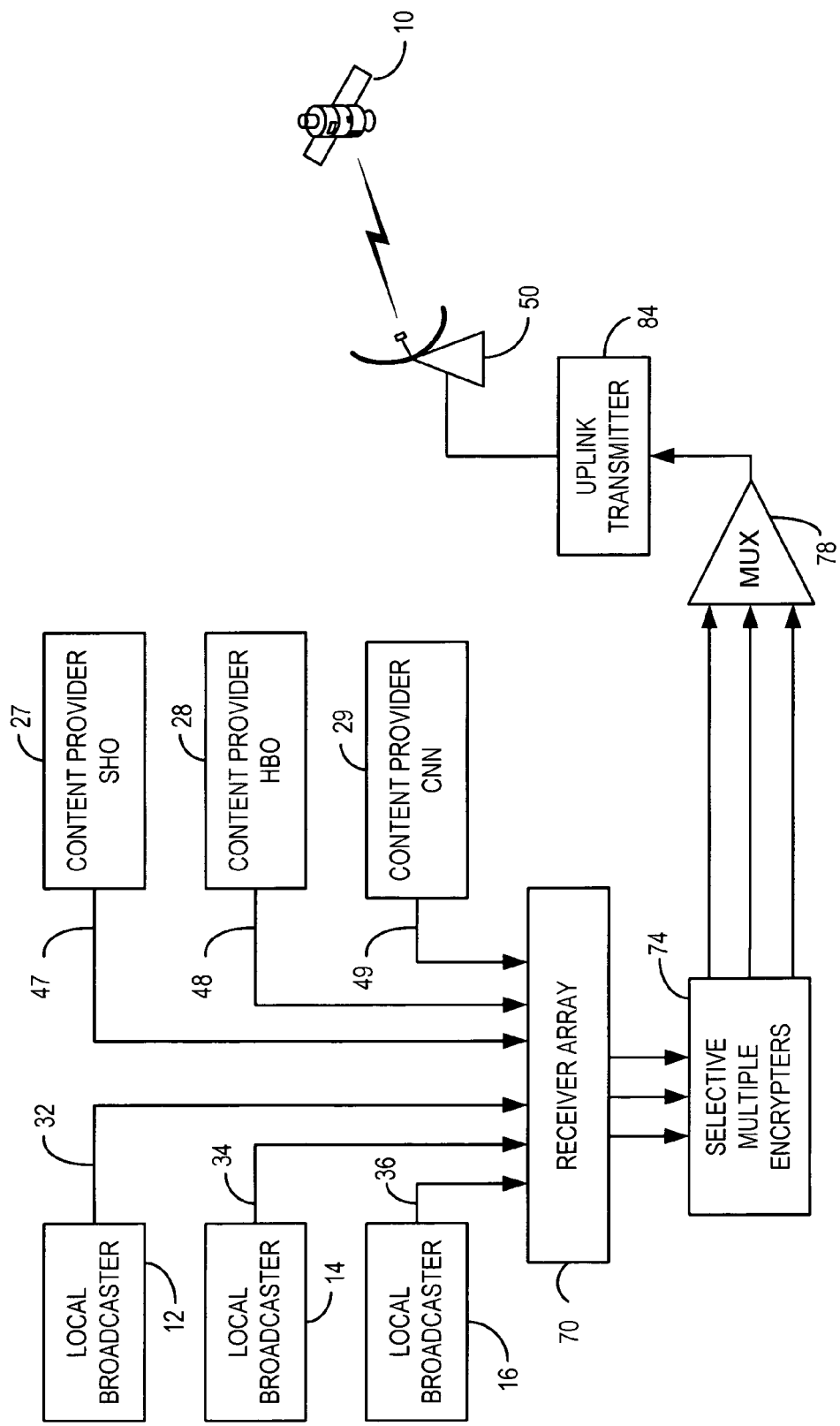
FIG. 2 is a block diagram illustrating an exemplary central uplink arrangement consistent with certain embodiments of the present invention.

FIG. 2 depicts a more detailed illustration of an exemplary embodiment that processes content from broadcasters 12, 14 and 16, and content providers 27, 28, and 29 for simplicity. It will be appreciated by those skilled in the art that this illustration represents a dramatic simplification for purposes of ease of understanding, and many more local broadcasters for many broadcast regions and many content providers may be processed by extension of the techniques discussed herein. The multiple inputs are received at an array of receivers 70 which demodulate, decrypt or otherwise process the received content into streams of un-encrypted digital packets that are passed along for processing to selective multiple encrypters 74 which selectively multiple encrypts each of the streams from the receiver array 70 into selective multiple encrypted streams encrypted using a plurality of CA and or DRM systems as will be discussed later. Each such selectively multiple encrypted stream is then multiplexed with the others at multiplexer 78 to produce a transport stream for modulation, upconversion and transmission by uplink transmitter via dish antenna 50 to satellite 60.

Figure 3:
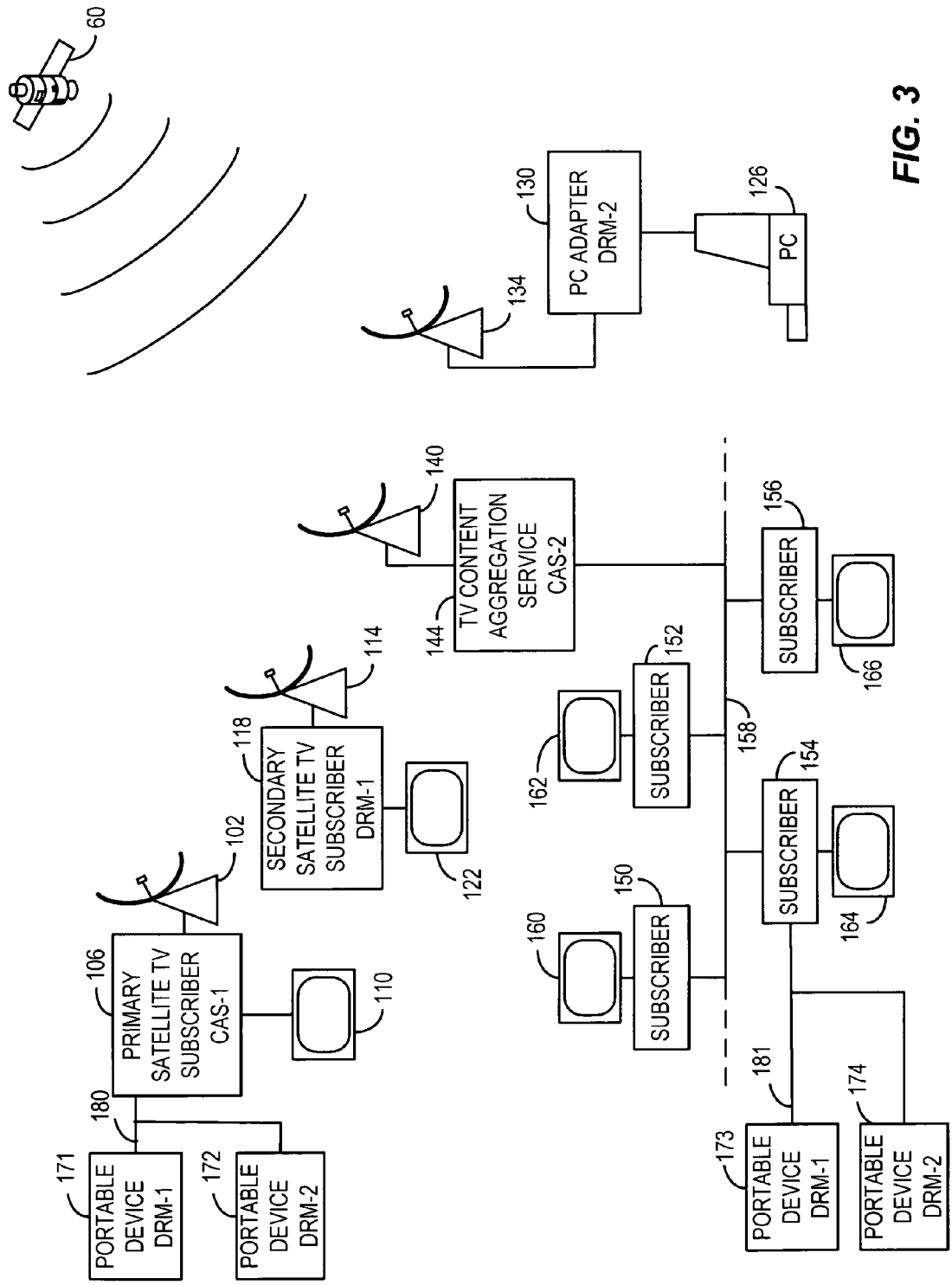
FIG. 3 is an illustration of four exemplary services enabled by the selective multiple encryption overlay consistent with certain embodiments of the present invention.

FIG. 3 depicts one arrangement of the downlink side of the communication pathway from the satellite 60. This downlink side may represent one small or large geographic area as desired and configured according the needs of the satellite service provider by multiplexing the stream for transmission by one or more transponders of satellite 60. In the case of providing conventional satellite television service to a collection of satellite service providers, the broadcast selectively multiple encrypted stream is broadcast from the satellite 60 and received by a satellite dish and a set top box (STB) converter 106 under a first conditional access system CAS-1. The STB then converts the signal to a suitable format for display on a television set or display 110 (e.g., a digital television display or conventional NTSC or PAL television).

However, under the current embodiment using selective encryption, the STBs 108 and 154 may pass DRM encrypted content to portable devices 171 and 172 using connections 180 such as Universal Serial Bus (USB) or Ethernet. The DRM encrypted content along with "non-critical" content sent in the clear may also be transferred to the other devices via mounted flash memory such as Memory Stick, Compact Flash or SD memory. The content could also be passed to the other devices using writeable CDs, DVDs, or Blu-ray™ Discs. Blu-ray Discs currently employ the Advanced Access Content System (AACS) to protect content which is a DRM system. At the uplink, content could be encrypted using AACS. As discussed later, the STB may need to first decrypt the non-critical packets using a shared coverage key or CAS-1 key. In addition, the DRM encrypted packets may have been dual encrypted, and should be decrypted using a CAS-1 key first. This scenario can allow a service provider to make sure that only devices attached to an authorized receiver device such as a television set top box (STB) will be able to gain access to the content. However, alternatively, the devices can be enabled to access the content through DRM methods and the service provider can make sure that they are associated with a paying customer.

In addition, under the current embodiment utilizing selective multiple encryption, a secondary satellite service subscriber can be enabled to acquire and consume DRM protected content directly assuming that the non-critical packets are sent in the clear or encrypted with a share coverage key. Dual encryption of the DRM package with CAS-1 is not supported in this case. In this scenario, the same multiple selectively encrypted television signal stream is received at a dish antenna or other suitable antenna 114 which decrypts the content using a specified DRM system (DRM-1) at a satellite receiver 118 for display on display 122. In accord with certain embodiments, the display 122 and adapter 118 and antenna 114 may be realized in a portable or mobile device such as a palmtop computer, notebook computer, wireless telephone device or other such apparatus. In other embodiments, the DRM-1 enabled content can simply be consumed by another class of subscribers utilizing a STB adapter. Other variants will occur to those skilled in the art upon consideration of the present teachings. By way of example, and not limitation, DRM-1 can be a proprietary DRM system that is licensed or otherwise provided by the satellite service provider.

In another case, a personal computer device such as a notebook or desktop computer 126 can be adapted to be the display device an internal or external adapter 130 (including so-called "dongle" adapters that connect via a USB port or the like) to receive the satellite signal via an antenna 134 (represented as a dish, but not necessarily embodied as such). In one convenient embodiment, DRM-2 as used by adapter 130 can be an implementation of Microsoft's WM-DRM or other widely available and currently fielded DRM systems, for example, to enable a wide audience for the content without need for dealing with multiple DRM systems. This is possible, for example using WM-DRM, due to its widespread and near ubiquitous presence in existing PCs. Similarly, DRM systems from Apple Computer Corp. or other sources can be accommodated by use of MSE without need to consume large amounts of bandwidth.

In still another embodiment, the satellite service provider can provide a content aggregation service to, for example, a cable, telco or private network, by using a secondary CAS system (CAS-2) to selectively multiple encrypt content that is then redistributed to subscribers or other members of the private network. In this manner, for minimal bandwidth impact, the satellite service provider can expand its business to supplying high quality television content to a reseller or private network. In one example of this scenario, the same MSE content is received from satellite 60 at antenna 140 for consumption by aggregation service 144. Such aggregation service may then utilize a secondary CAS system (CAS-2) for decryption of the content and local re-encryption for commercial redistribution (possibly with other content from other sources) to subscribers or members such as 150, 152, 154 and 156 via network 158 for display on any suitable display 160, 162, 164 and 166 respectively. Non-critical packets may be either sent in the clear or encrypted using a coverage key. The TV content aggregation service 144 may also pass through DRM content. For example, the content may be received by subscriber 154, and in a similar fashion as in the satellite TV subscriber case 106 described above, sent to portable devices 173 and 174 using connection 181 which could be any suitable connection interface.

As is noted in the above-referenced documents, a relatively high level of security can be achieved by multiple selectively encrypting only a small amount of content. As a result, the increased bandwidth consumption required to provide content to multiple services using multiple encryption arrangements is a small sacrifice for the enhanced functionality. In one embodiment, for example, only the I-frames or I-frame headers in an MPEG (Motion Pictures Expert Group) compliant digital signal need be encrypted to provide substantial levels of security. However, as also noted in the above-referenced documents, several techniques can be used for a selection criterion for selecting so-called "critical packets" for encryption. Additionally, the normally clear packets can be encrypted using a common "coverage key" or CA key to provide an even more secure protection mechanism for encrypted content. The DRM packets may dual encrypted— DRM first, and then CA. This is a way to bind the DRM content more closely with the CA system. The CA system is typically tied into the service operators billing system. On the receiver side, the customer may need to pay an extra fee to "unlock" the DRM packets, e.g. by decrypting the packets using the CA system first. The DRM encryption may then be used to control the play out and to copy protect the content.

Referring now to FIG. 4, an example content stream is shown as it would appear from one output of the selective multiple encrypters 74 prior to multiplexing at 78. In this example, two CAS systems and two DRM systems CAS-1, CAS-2, DRM-1 and DRM-2 are used to multiple encrypt selected content (the critical packets) that is selected from the stream from any of the broadcasters (For example, the I frame packets from an MPEG compliant formatted movie or television program). As is the case with MSE, the selected segments of content is, in this example, duplicated to produce four copies of the selected segments of the content (e.g., the -1 frame packets). These duplicated segments of content (the critical packets) are encrypted by four different encryption methods corresponding to CAS-1, CAS-2, DRM-1 and DRM-2, and reinserted into the stream (or alternatively, the stream can be otherwise assembled from multiple fully encrypted copies and one unencrypted copy of the entire content, to produce the same resultant output). In this case, it leads to a stream having clear (unencrypted, non-critical) packets such as 202, 204, 206 and 208 (etc.) with occasional sequences of encrypted packets containing each of the selected encrypted copies of the critical packets such as 210, 212, 214 and 216. Such encrypted packets can be distinguished as indicated in the above-referenced patent documents by use of packet identifiers (PIDs) associated with each of the encryption methods used to encrypt the selected content, thus producing a selectively encrypted stream 220.

In a variation on the selective encryption arrangement just described, the clear packets (the non-critical packets) such as 202, 204, 206 and 208 are encrypted using a so called "coverage key" that is shared by CAS-1, CAS-1, DRM-1 and DRM-2 to produce stream 230 of FIG. 5, wherein the non-critical packets such as 202, 204, 206 and 208 are encrypted by a coverage encryption method that is common to all receivers to produce encrypted packets 202A, 204A, 206A and 208A, etc. The "coverage key" can be calculable or derivable by each CAS or DRM system so that a receiver or portable device may decrypt the non-critical packets.

The protective key encryption concept can be extended further as depicted in FIG. 6, in which the normally clear packets are encrypted under encryption systems CAS-1. For this scenario, it may not make sense to also selectively multiple encrypt with a CAS-2. In this figure, the packet 217 can be any other content in the stream. This produces not only CAS-1 encrypted "non-critical" packets 202A, 204A, 206A but also stream 240.

The CAS protective key encryption concept can be extended further as depicted in FIG. 7, in which the DRM-1 and DRM-2 packets are double encrypted—first using their native encryption and then with the CAS-1 key encryption method. As in the scenario for FIG. 6, it may not make sense to also selectively multiple encrypt with a CAS-2. In this figure, the packet 217 can be any other content in the stream. This produces not only coverage encrypted "non-critical" packets 202A, 204A, 206A and 208A, etc., but also dual encrypted packets with 210A and 212A to produce stream 250.

The term "double encrypted" as used herein is distinguished from "multiple selective encrypted" in that double encrypted means that a particular segment of the content is encrypted twice, whereas, multiple selective encrypted content has multiple encryption methods used on duplicate copies of a segment of the content.

The ultimate consumer device such as a TV, portable device or other may receive content once processed by the subscriber hardware in any number of forms. FIGS. 8-11 depict a few of the many possibilities, and illustrates how the subscriber terminal has very little processing to do in order to prepare content for the device (e.g., 171-174, 126, 164, etc) that ultimately consumes the content. In some cases, the stripping out irrelevant content is done, and possibly remapping of packet identifiers. In some cases, the input stream 220, 230, 240 or 250 could even be passed directly, with irrelevant content simply ignored at the ultimate consumer device. The subscriber hardware can carry out the processing of the incoming stream to produce an output, in many cases, by simply deleting unneeded portions of the stream (e.g., the CAS encrypted segments or packets. This can be accomplished, for example, using dedicated hardware or a programmed processor.

Considering FIG. 8, the signal 260 represents the output of the subscriber hardware that might be delivered to either a DRM 1 compatible device or a DRM 2 compatible device. In this example, signal 220 of FIG. 4 is stripped of conditional access system CAS-1 and CAS-2 encrypted content with the remainder of the content delivered as stream 260. This stream 260 could also represent stream 230 of FIG. 5 after decryption using the coverage key to produce clear content at packets 202, 204, 206, 208, etc.

FIG. 9 represents an example of content from the subscriber hardware which processes the content of stream 230 of FIG. 5 or 220 of FIG. 4 to produce stream 266 which is suitable for use only using DRM-1. In the case of stream 230, the content encrypted using the coverage key is decrypted to produce packets 202, 204, 206, 208, etc.

FIGS. 10 and 11 reflect similar output streams 270 and 276 which retain or produce protection of the clear content by use of a coverage key. In the case of stream 270, the stream retains compatibility with both DRM-1 and DRM-2, while stream 276 is stripped of CAS-1, CAS-2, DRM-2 and any other extraneous information. It will be evident to those skilled in the art that any number of variants can be produced by the subscriber hardware depending upon the services offered and device compatibility as well as the subscriber's intentions in terms of subscription to content.

Many variations of the above embodiments are possible and will be evident to those skilled in the art upon consideration of the present teachings. In one example, the transmitter that transmits the selectively multiple encrypted television content stream can transmit from either a cable or IPTV headend facility so that the selectively multiple encrypted television content stream can be decrypted under either a system using at least one CAS and at least one DRMS. Other embodiments will also be evident those skilled in the art upon consideration of the above teachings.

Thus, a television content delivery system consistent with certain embodiments has a receiver system that receives television content from a plurality of content suppliers. A selective multiple encrypter selectively multiple encrypts the television content, wherein the resultant selectively multiple encrypted content stream is encrypted under at least one conditional access system (CAS) and at least one digital rights management system (DRMS). An uplink satellite transmitter transmits the selectively multiple encrypted television content stream to a geosynchronous earth orbiting satellite for rebroadcast toward a specified geographic region for receipt and decrypting by multiple receiver systems, so that the selectively multiple encrypted television content stream can be decrypted under either a system using at least one CAS and at least one DRMS.

In certain embodiments, a television content aggregator receives the rebroadcast selectively multiple encrypted content stream and decrypts the selectively multiple encrypted content stream under the at least one CAS for retransmission to subscribers over a wire or fiber based network. In certain embodiments, the rebroadcast selectively multiple encrypted content stream is selectively multiple encrypted under the at least two CAS, and wherein the second CAS system permits satellite subscribers to directly decrypt the rebroadcast selectively multiple encrypted content stream. In certain embodiments, the DRMS permits subscribers to directly decrypt the rebroadcast selectively multiple encrypted content stream In certain embodiments, the multiple selectively encrypted content stream is further encrypted using a coverage encryption system to encrypt at least non-critical packets. In certain embodiments, the CAS is also used to double encrypt the DRM encrypted critical packets.

In another embodiment, a television content delivery system has a receiver system that receives television content from a plurality of content suppliers. A selective multiple encrypter selectively multiple encrypts the television content, wherein the resultant selectively multiple encrypted content stream is encrypted under at least two conditional access system (CAS). An uplink satellite transmitter that transmits the selectively multiple encrypted television content stream to a geosynchronous earth orbiting satellite for rebroadcast toward a specified geographic region for receipt and decrypting by multiple receiver systems, so that the selectively multiple encrypted television content stream can be decrypted under either a system using at least two CAS, and wherein one of the CAS streams is destined for direct decryption by satellite service system subscribers.

In certain embodiments, a television content aggregator receives the rebroadcast selectively multiple encrypted content stream and decrypts the selectively multiple encrypted content stream under a second of the at least two CAS for retransmission to subscribers over a wire or fiber based network. In certain embodiments, the multiple selectively encrypted content stream is further encrypted using a coverage encryption system to encrypt at least non-critical packets. In certain embodiments, a CAS system is also used to double encrypt the DRM encrypted critical packets.

In other embodiments, a television content delivery system has a receiver system that receives television content from a plurality of content suppliers. A selective multiple encrypter selectively multiple encrypts the television content, wherein the resultant selectively multiple encrypted content stream is encrypted under at least two conditional access system (CAS) and at least one digital rights management system (DRMS). An uplink satellite transmitter transmits the selectively multiple encrypted television content stream to an earth orbiting satellite for rebroadcast toward a specified geographic region for receipt and decrypting by multiple receiver systems, so that the selectively multiple encrypted television content stream can be decrypted under either a system using at least two CAS and at least one DRMS. A television content aggregator receives the rebroadcast selectively multiple encrypted content stream and decrypts the selectively multiple encrypted content stream under one of the CAS for retransmission to subscribers over a wire or fiber based network. The second CAS system permits satellite subscribers to directly decrypt the rebroadcast selectively multiple encrypted content stream. The DRMS permits subscribers to directly decrypt the rebroadcast selectively multiple encrypted content stream.

In certain embodiments, the multiple selectively encrypted content stream is further encrypted using a coverage encryption system to encrypt at least non-critical packets. In certain embodiments, a CAS is also used to double encrypt the DRM encrypted critical packets.

In another embodiment, a television content delivery system has a receiver system that receives television content from a plurality of content suppliers. A selective multiple encrypter selectively multiple encrypts the television content, wherein the resultant selectively multiple encrypted content stream is encrypted under at least one conditional access system (CAS) and at least one digital rights management system (DRMS). A transmitter transmits the selectively multiple encrypted television content stream to multiple receivers, so that the selectively multiple encrypted television content stream can be decrypted under either a system using at least one CAS or at least one DRMS.

In certain embodiments, the transmitted selectively multiple encrypted content stream has DRM encrypted packets that are also encrypted with a CAS system. In certain embodiments, the transmitted selectively multiple encrypted content stream has non-critical packets encrypted with a CAS system. In certain embodiments, the transmitted selectively multiple encrypted content stream has non-critical packets encrypted with a shared coverage key. In certain embodiments, the transmitter that transmits the selectively multiple encrypted television content stream from an uplink facility to a geosynchronous earth orbiting satellite for rebroadcast toward a specified geographic region for receipt and decrypting by multiple receivers, so that the selectively multiple encrypted television content stream can be decrypted under either a system using at least one CAS and at least one DRMS. In certain embodiments, the transmitter that transmits the selectively multiple encrypted television content stream from either a cable or IPTV headend facility so that the selectively multiple encrypted television content stream can be decrypted under either a system using at least one CAS and at least one DRMS.

In another embodiment, a multiple selective encrypted content processing system has a receiver that receives an input stream of multiple selectively encrypted video content. The multiple selectively encrypted video content is selectively encrypted using at least one conditional access system (CAS) encryption method and at least one digital rights management (DRM) encryption method. A processor processes the input stream to remove specified encrypted segments of the multiple selectively encrypted content but leaves at least one set of selectively encrypted content, such at least one set of selectively encrypted content being DRM encrypted. An output provides the selectively DRM encrypted content as an output therefrom.

In certain embodiments, the selectively DRM encrypted content comprises multiple selectively DRM encrypted content. In certain embodiments, the selectively DRM encrypted output has DRM encrypted packets that are also encrypted with a CAS system. In certain embodiments, the selectively DRM encrypted output has non-critical packets encrypted with a CAS system. In certain embodiments, the selectively encrypted output has non-critical packets encrypted with a shared coverage key.

A multiple selective encryption processing method involves receiving an input stream of multiple selectively encrypted video content; wherein the multiple selectively encrypted video content is selectively encrypted using at least one conditional access system (CAS) encryption method and at least one digital rights management (DRM) encryption method; removing specified encrypted segments of the multiple selectively encrypted content while leaving at least one set of selectively encrypted content, such at least one set of selectively encrypted content being DRM encrypted; and providing the selectively DRM encrypted content as an output therefrom.

In certain embodiments, the selectively DRM encrypted content comprises multiple selectively DRM encrypted content. In certain embodiments, the selectively DRM encrypted output has DRM encrypted packets that are also encrypted with a CAS system. In certain embodiments, the selectively DRM encrypted output has non-critical packets encrypted with a CAS system. In certain embodiments, the selectively encrypted output has non-critical packets encrypted with a shared coverage key.

Those skilled in the art will recognize, upon consideration of the above teachings, that certain of the above exemplary embodiments can based upon use of one or more programmed processors, computers or other programmable devices. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

While certain embodiments herein were described in conjunction with specific circuitry that carries out the functions described, other embodiments are contemplated in which the circuit functions are carried out using equivalent embodiments executed on one or more programmed processors.

While certain illustrative embodiments have been described, it is evident that many alternatives, modifications, permutations and variations will become apparent to those skilled in the art in light of the foregoing description.

What is claimed is:

1. A television content delivery system, comprising:
    a receiver system that receives television content from a plurality of content suppliers;
    a selective multiple encrypter that selectively multiple encrypts the television content by selecting portions of the television content to encrypt and encrypting duplicate portions of the selected content using different encryption methods, wherein the resultant selectively multiple encrypted content stream is encrypted under at least one conditional access system (CAS) and at least one digital rights management system (DRMS); and
    an uplink satellite transmitter that transmits the selectively multiple encrypted television content stream to a geosynchronous earth orbiting satellite for rebroadcast toward a specified geographic region for receipt and decrypting by multiple receiver systems, so that the selectively multiple encrypted television content stream can be decrypted under either a system using at least one CAS and at least one DRMS.

2. The television content delivery system according to claim 1, further comprising a television content aggregator that receives the rebroadcast selectively multiple encrypted content stream and decrypts the selectively multiple encrypted content stream under the at least one CAS for retransmission to subscribers over a wire or fiber based network.

3. The television content delivery system according to claim 1, wherein the rebroadcast selectively multiple encrypted content stream is selectively multiple encrypted under the at least two CAS, and wherein the second CAS system permits satellite subscribers to directly decrypt the rebroadcast selectively multiple encrypted content stream.

4. The television content delivery system according to claim 1, wherein the DRMS permits subscribers to directly decrypt the rebroadcast selectively multiple encrypted content stream.

5. The television content delivery system according to claim 1, wherein the multiple selectively encrypted content stream is further encrypted using a coverage encryption system to encrypt at least non-critical packets.

6. The television content delivery system according to claim 1, wherein the CAS is also used to double encrypt the DRM encrypted critical packets.

7. A television content delivery system, comprising:
    a receiver system that receives television content from a plurality of content suppliers;
    a selective multiple encrypter that selectively multiple encrypts the television content by selecting portions of the television content to encrypt and encrypting duplicate portions of the selected content using different encryption methods, wherein the resultant selectively multiple encrypted content stream is encrypted under at least two conditional access system (CAS); and
    an uplink satellite transmitter that transmits the selectively multiple encrypted television content stream to a geosynchronous earth orbiting satellite for rebroadcast toward a specified geographic region for receipt and decrypting by multiple receiver systems, so that the selectively multiple encrypted television content stream can be decrypted under either a system using at least two CAS, and wherein one of the CAS streams is destined for direct decryption by satellite service system subscribers.

8. The television content delivery system according to claim 7, further comprising a television content aggregator that receives the rebroadcast selectively multiple encrypted content stream and decrypts the selectively multiple encrypted content stream under a second of the at least two CAS for retransmission to subscribers over a wire or fiber based network.

9. The television content delivery system according to claim 7, wherein the multiple selectively encrypted content stream is further encrypted using a coverage encryption system to encrypt at least non-critical packets.

10. The television content delivery system according to claim 7, wherein a CAS system is also used to double encrypt the DRM encrypted critical packets.

11. A television content delivery system, comprising:
    a receiver system that receives television content from a plurality of content suppliers;
    a selective multiple encrypter that selectively multiple encrypts the television content by selecting portions of the television content to encrypt and encrypting duplicate portions of the selected content using different encryption methods, wherein the resultant selectively multiple encrypted content stream is encrypted under at least two conditional access system (CAS) and at least one digital rights management system (DRMS);
    an uplink satellite transmitter that transmits the selectively multiple encrypted television content stream to an earth orbiting satellite for rebroadcast toward a specified geographic region for receipt and decrypting by multiple receiver systems, so that the selectively multiple encrypted television content stream can be decrypted under either a system using at least two CAS and at least one DRMS;
    a television content aggregator that receives the rebroadcast selectively multiple encrypted content stream and decrypts the selectively multiple encrypted content stream under one of the CAS for retransmission to subscribers over a wire or fiber based network;
    wherein the second CAS system permits satellite subscribers to directly decrypt the rebroadcast selectively multiple encrypted content stream;
    wherein the DRMS permits subscribers to directly decrypt the rebroadcast selectively multiple encrypted content stream.

12. The television content delivery system according to claim 11, wherein the multiple selectively encrypted content stream is further encrypted using a coverage encryption system to encrypt at least non-critical packets.

13. The television content delivery system according to claim 11, wherein a CAS is also used to double encrypt the DRM encrypted critical packets.

14. A television content delivery system, comprising:
a receiver system that receives television content from a plurality of content suppliers;
a selective multiple encrypter that selectively multiple encrypts the television content by selecting portions of the television content to encrypt and encrypting duplicate portions of the selected content using different encryption methods, wherein the resultant selectively multiple encrypted content stream is encrypted under at least one conditional access system (CAS) and at least one digital rights management system (DRMS); and
a transmitter that transmits the selectively multiple encrypted television content stream to multiple receivers, so that the selectively multiple encrypted television content stream can be decrypted under either a system using at least one CAS or at least one DRMS.

15. The television content delivery system according to claim 14, wherein the transmitted selectively multiple encrypted content stream has DRM encrypted packets that are also encrypted with a CAS system.

16. The television content delivery system according to claim 14, wherein the transmitted selectively multiple encrypted content stream has non-critical packets encrypted with a CAS system.

17. The television content delivery system according to claim 14, wherein the transmitted selectively multiple encrypted content stream has non-critical packets encrypted with a shared coverage key.

18. The television content delivery system according to claim 14, wherein the transmitter that transmits the selectively multiple encrypted television content stream from an uplink facility to a geosynchronous earth orbiting satellite for rebroadcast toward a specified geographic region for receipt and decrypting by multiple receivers, so that the selectively multiple encrypted television content stream can be decrypted under either a system using at least one CAS and at least one DRMS.

19. The television content delivery system according to claim 14, wherein the transmitter that transmits the selectively multiple encrypted television content stream from either a cable or IPTV headend facility so that the selectively multiple encrypted television content stream can be decrypted under either a system using at least one CAS and at least one DRMS.

20. A multiple selective encrypted content processing system, comprising:
a receiver that receives an input stream of multiple selectively encrypted video content;
wherein the multiple selectively encrypted video content is selectively encrypted by selecting portions of the television content to encrypt and encrypting duplicate portions of the selected content using different encryption methods, using at least one conditional access system (CAS) encryption method and at least one digital rights management (DRM) encryption method;
a processor that processes the input stream to remove specified encrypted segments of the multiple selectively encrypted content but leaves at least one set of selectively encrypted content, such at least one set of selectively encrypted content being DRM encrypted; and
an output that provides the selectively DRM encrypted content as an output therefrom.

21. The system according to claim 20, wherein the selectively DRM encrypted content comprises multiple selectively DRM encrypted content.

22. The system according to claim 20, wherein the selectively DRM encrypted output has DRM encrypted packets that are also encrypted with a CAS system.

23. The system according to claim 20, wherein the selectively DRM encrypted output has non-critical packets encrypted with a CAS system.

24. The system according to claim 20, wherein the selectively encrypted output has non-critical packets encrypted with a shared coverage key.

25. A multiple selective encryption processing method, comprising:
at a processor, receiving an input stream of multiple selectively encrypted video content;
wherein the multiple selectively encrypted video content is selectively encrypted by selecting portions of the television content to encrypt and encrypting duplicate portions of the selected content using different encryption methods, using at least one conditional access system (CAS) encryption method and at least one digital rights management (DRM) encryption method; removing specified encrypted segments of the multiple selectively encrypted content while leaving at least one set of selectively encrypted content, such at least one set of selectively encrypted content being DRM encrypted; and
providing the selectively DRM encrypted content as an output therefrom.

26. The method according to claim 25, wherein the selectively DRM encrypted content comprises multiple selectively DRM encrypted content.

27. The method according to claim 25, wherein the selectively DRM encrypted output has DRM encrypted packets that are also encrypted with a CAS system.

28. The method according to claim 25, wherein the selectively DRM encrypted output has non-critical packets encrypted with a CAS system.

29. The method according to claim 25, wherein the selectively encrypted output has non-critical packets encrypted with a shared coverage key.

* * * * *